United States Patent Office 3,547,839
Patented Dec. 15, 1970

3,547,839
FOAMABLE RESIN COMPOSITION AND PROCESS FOR PREPARING FOAMED RESINS
Stanley Tocker, Wilmington, Del., assignor to E. I. du Pont de Nemours and Company, Wilmington, Del., a corporation of Delaware
No Drawing. Continuation of application Ser. No. 329,976, Dec. 12, 1963. This application Feb. 29, 1968, Ser. No. 709,211
Int. Cl. C08f 47/10; C08j 1/18
U.S. Cl. 260—2.5                 8 Claims

ABSTRACT OF THE DISCLOSURE

A foamable composition of a foamable polymeric resin such as, for example, polyethylene, and polyoxymethylene is provided. The foamable composition is converted into a foamed polymeric product by heating the composition to a temperature above the decomposition temperature of polyoxymethylene which decomposes into gaseous formaldehyde which expands the resin product. The foamed resin is then cooled to obtain the foamed product.

---

The present application is a continuation of copending application Ser. No. 329,976, filed Dec. 12, 1963, now abandoned.

This invention relates to processes for preparing foamed resins and more particularly to foamable blends of thermoplastic resins and polyoxymethylene and processes for preparing foamed thermoplastic resins from the blends.

Foamed products manufactured from thermoplastic polymers such as polyethylene and polystyrene find extensive application as replacements for conventional polymers in such end uses as insulation, sound barriers, materials for cushioning, shock absorbing, packaging, and decoration.

Heretofore, the foaming of many polymers has required the use of expensive or unstable additives as blowing agents which have served to limit the market for foamed products. Additionally, some of the blowing agents employed have a tendency to leave residues which adversely effect the properties of the foamed polymer.

It is, therefore, an object of this invention to provide an improved process for the preparation of foamed polymeric materials.

It is a further object of this invention to provide a process for the preparation of foamed polymeric materials capable of utilizing as a blowing agent a relatively inexpensive material which on thermal decomposition yields a high volume of gas and decomposes completely, thereby eliminating residual matter in the foamed polymer.

It is a still further object of this invention to provide stable blends of organic thermoplastic polymers and blowing agents which, when subjected to the proper thermal conditions, will form a foamed polymeric product. These and other objects will appear hereinafter.

The process of the present invention comprises (1) blending the foamable polymeric resin with a solid particulate polymer of oxymethylene having a decomposition temperature below the melt point of the polymeric resin, (2) heating the blend to a temperature above which the polymer of oxymethylene decomposes for a time sufficient to allow the released gaseous formaldehyde to expand the resin and (3) thereafter cooling the resultant foamed product.

In the preferred embodiment, an unstabilized polyoxymethylene is utilized as the blowing agent, i.e., a linear polymer of formaldehyde, trioxane or polymer where the group —($CH_2O$)— is a predominant portion of the polymer chain, which has not been stabilized against thermal degradation by the inclusion of stable end groups on the polymer chain or a stabilized polyoxymethylene which because of an added compound (e.g., an acid) would behave in a manner similar to the unstabilized polymer.

The term polyoxymethylene as used in the present invention includes not only the homopolymers of formaldehyde but also the copolymers of formaldehyde of formaldehyde or trioxane with materials such as ethylene oxides, vinyl ethers and other comonomers as is known in the art. For the copolymers, the oxymethylene group occupies a predominant position in the polymer chain, usually above 95 percent.

The polyoxymethylenes utilized in the process of the present invention show great advantage as foaming agents for formable thermoplastic polymeric resins. The four major advantages of these polymers over other commercial blowing agents are (1) appreciably lower costs of the polyoxymethylene resins compared with other blowing agents used commercially, (2) the unusually high gas yield per unit weight released by these polymers, (3) the ability to decompose completely without the formation of undesirable residues in the foam products and (4) the excellent compatibility with foamable polymeric materials prior to decomposition, i.e., little tendency to sublime or migrate out of the polymeric material—a problem common with many non-polymeric blowing agents.

The unusually high gas yield per unit weight of the polyoxymethylenes utilized as foaming agents during the process of the present invention may be illustrated by Table I, below, listing the comparative theoretical gas yields [cc. (S.T.P.)/g.] of unstabilized polyoxymethylene and other commercial foaming agents.

TABLE I

Theoretical gas yields of unstabilized polyoxymethylene and principal commercial foaming agents

| Foaming agent: | Theoretical gas yield cc. (S.T.P.)/g. |
|---|---|
| Unstabilized polyoxymethylene | 750 |
| Azodicarbonamide | 193 |
| Azobisisobutyronitrile | 136 |
| Benzene sulfonyl hydrazide | 130 |
| Diazoaminobenzene | 108 |
| N,N'-dimethyl-N,N'-dinitrosoterephthalamide | 180 |
| Dinitrosopentamethylene tetramine | 240 |
| 4,4'-diphenyl disulfonylazide | 123 |
| 4,4'-oxybis(benzene sulfonyl hydrazide) | 125 |

The thermoplastic resin employed in the process of the invention can be essentially any resin which is capable of being expanded via the medium of released gaseous matter. Examples of thermoplastic resins that can be employed include cellulose ethers and esters, e.g., ethyl cellulose, cellulose acetate; homopolymers and interpolymers of monomeric compounds containing the grouping

wherein R¹ is selected from one of the following groups:
—H, —Cl, —Br, —F, —CHO, —CN, —C₆H₅

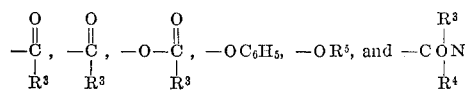

wherein R³ and R⁴ are each selected from the group consisting of alkyl and —H, R⁵ is alkyl, and wherein R² is selected from the group consisting of R¹, —H, and alkyl of 1–4 carbon atoms. Such polymers include the alpha-olefins such as polyethylene (linear and branched), polypropylene, polyisobutylene, etc.; homopolymers or copolymers derived from a vinylidene monomer such as a vinyl halide, e.g., vinyl chloride, vinyl bromide, vinyl fluoride; vinylidene chloride; and an acyclic olefin, e.g., butadiene; a vinyl ester of a monocarboxylic acid, e.g., vinyl formate, vinyl acetate, vinyl stearate, vinyl benzoate; an unsaturated carboxylic acid or a derivative thereof, e.g., acrylic acid, methacrylic acid, ethyl acrylate, methyl methacrylate, 2-ethyl hexyl acrylate, acrylamide, methacrylamide, acrylonitrile, methacrylonitrile; a vinylidene aromatic compound, e.g., styrene, alpha-methylstyrene, vinyl naphthalene; an interpolymer of the vinylidene polymer of the above type with an alpha-beta-unsaturated polycarboxylic acid or a derivative thereof, e.g., maleic anhydride, diethyl maleate, dibutyl fumarate, etc.

Additionally, condensation type polymers such as ethylene terephthalate polymers and copolymers, polyamides, polyamide-acids, polyurethanes may be treated by the present process. Other polymers that can be used in the present invention are copolymers of formaldehyde with a polyfluoroketone of the formula X—CF₂—CO—CF₂—X' in which X and X' can each be hydrogen, fluorine, chlorine, polyfluoroalkyl, chloropolyfluoroalkyl and alkoxypolyfluoroalkyl, in which the alkyl groups contain up to 18 carbon atoms.

Applicable also are blends of two or more thermoplastic resins of the above types or a graft copolymer prepared by polymerizing a vinylidene monomer in the presence of the preformed polymer.

In some cases wherein decomposition takes place before plastic flow occurs, e.g., in the case of vinylidene chloride, vinyl benzoate, or methyl methacrylate, the addition of plasticizers or solvents can be employed to provide a lower softening temperature for the polymer. In all of these cases, the polymers are included in the term foamable thermoplastic polymeric resin.

The temperature at which the foaming process is carried out and the type of linear polymer of oxymethylene utilized as the foaming agent (i.e., stabilized or unstabilized) will depend upon the thermoplasticity of the particular resin to be treated.

It is critical that the foaming agent decomposes rapidly and completely at the temperature chosen to carry out the foaming process. The temperature selected, as stated hereinbefore, for the foaming operation will depend upon the thermoplastic characteristics of the polymer to be foamed and the method of foaming employed. In molding operations, for example, the polymer must be heated to a temperature at or above which the polymer softens slightly but below that point at which it becomes essentially molten. For such commonly employed materials as the alpha-olefins (polyethylene) and vinylidene polymers such as polyvinyl chloride and polystyrene, the processing temperature will range between 70–225° C. As mentioned previously, plasticizers or solvents can be added to lower the softening temperature of the polymer.

At these processing temperatures, unstabilized polyoxymethylene is ideally employed as the foaming agent.

In the case of higher melting thermoplastic polymers such as polyethylene terephthalate and other similar polyester materials, it will be necessary to utilize processing temperatures considerably higher e.g., 170–275° C. In this instance, a stabilized polyoxymethylene resin in U.S. Pat. 2,768,994 to McDonald which decomposes at temperatures in excess of 230° C. may be employed.

An outstanding advantage of the present invention is the excellent compatibility of the high molecular weight polymeric oxymethylene when intimately admixed with the thermoplastic polymer to be processed. Since these polyoxymethylene resins will not sublime or migrate out of the thermoplastic material, mixtures can be prepared well in advance of the foaming operation thus allowing for the extended storing or shipping of a polymer-foaming agent in the form ready for immediate processing.

Another advantage in the use of polyoxymethylene foaming agents lies in the wide range in decomposition temperatures available for the foaming operation. A broad spectrum of decomposition temperatures can be obtained by varying the degree of stabilization ("end capping") or by the use of an activating agent known to accelerate the decomposition of polyoxymethylene to gaseous products e.g., acidic reagents or metal oxides or halides such as $Fe_2O_3$ and $CuCl_2$ accelerate the decomposition of linear polyoxymethylene thereby allowing a lower temperature to be used in the blowing operation.

The ratio of the linear polyoxymethylene admixed with the foamable thermoplastic material will depend upon the thermoplastic material employed and the desired degree of expansion desired. In most cases from 0.05 to 30 percent, preferably 5 to 20 percent, by weight of the total mixture of the foaming agent will suffice. Because of the significant increase in gas yield of the polyoxymethylene foaming agents of the present invention over that released by conventional blowing agents, substantially less foaming agent will be required to produce desired results.

The linear polyoxymethylene can be admixed with the thermoplastic polymer by any of several conventional techniques such as milling or melt extrusion in the case of melt-extrudable polymers.

The invention will now be further described by the following examples:

EXAMPLE 1

Nineteen grams of branched polyethylene ("Alathon" 10—Du Pont Company) and 1 g. of unstabilized polyoxymethylene are milled in a Banbury apparatus for five minutes at 100° C. The polyoxymethylene starts to decompose rapidly at 165° C. A 1 g. sample of this blend is placed in a 2″ x 2″ x ¼″ mold and heated at 165° C. for ten minutes. The mold is then chilled before opening, yielding a closed cell polymer which is expanded to two to three times is original volume.

EXAMPLE 2

A 1 g. sample of the blend prepared as in Example 1 is placed in the mold of Example 1 and heated at 200° C. for three minutes. Again a closed cell polymer is obtained which expanded to 2–3 times its original volume.

EXAMPLE 3

Nineteen grams of linear polyethylene ("Marlex" 50—Phillips Petroleum Corporation) and 1 g. of unstabilized polyoxymethylene are blended at 135° C. on a rubber mill. A 1 g. sample of this blend is placed in the mold of Example 1 and heated at 200° C. for 10 minutes. The mold is then chilled before opening, yielding a polymer which expanded to 2–3 times its original volume.

EXAMPLE 4

Nineteen grams of polypropylene fluff ("Profax"-6501—Hercules Powder Corporation) and 1 g. of unstabilized polyoxymethylene are mixed at room temperature. A 1 g. sample of this blend is placed in the mold of Example 1 and heated at 200° C. for ten minutes. The mold is then chilled before opening, yielding a closed cell polymer which expanded to 2–3 times its original volume.

EXAMPLE 5

A powdered blend of branched polyethylene ("Alathon"-14—Du Pont Company) containing 5% by weight of unstabilized polyoxymethylene is extruded at 225° C. into water using a screw extruder (18" barrel, 1" screw, 4" dye with a 27 mil opening, no screens). A closed cell foamed film is obtained having a density of approximately 0.5.

EXAMPLE 6

Nineteeen grams of an ethylene/vinyl acetate copolymer containing 32% by weight vinyl acetate (inherent viscosity of 0.83 as measured in an 0.81 weight percent solution of alphachloronaphthalene at 125° C.) and 1 g. unstabilized polyoxymethylene are milled at 100° C. for 10 minutes. A 1 g. sample of this blend is placed in a mold described in Example 1 and heated at 140° C. for 20 minutes. The mold is then chilled before opening, yielding a closed cell polymer which expanded to 2–3 times its original volume.

By using 0.3 g. of $Fe_2O_3$ in the above mixture, gas release is much more rapid at 140° C. and the blowing time is shortened to 10 minutes.

EXAMPLE 7

The following mixture is allowed to half fill the mold described in Example 1 and then heated at 190° C. for five minutes:

|  | G. |
|---|---|
| Polyvinyl chloride ("Geon" 121—B. F. Goodrich Chemical Company) | 1 |
| "Paraflex" Epoxy plasticizer G-62 (Rohm & Haas Company) | 0.5 |
| Unstabilized polyoxymethylene | 0.1 |

The mold is quickly chilled in water. Upon opening the mold, an off-white closed cell foam results which completely fills the cavity.

EXAMPLE 8

In a mold similar to that used in Example 1 is charged the following mixture: 1 g. powdered polyacrylonitrile (inherent viscosity 1.9 as measured in a 0.1% solution in dimethyl sulfoxide at 30° C.), 0.25 g. unstabilized polyoxymethylene and 0.5 g. dimethyl sulfoxide. The mold is heated at 200° C. for 10 minutes and is then quenched in water. The foamed polyacrylonitrile is washed with water for three days followed by drying in a vacuum oven at 50° C. for 12 hours. The slightly yellow product has open and closed cells and is about twice the volume of the charge.

EXAMPLE 9

To a solution of 2200 g. of bis(4-aminophenyl) ether in about 5.5 gals. of N,N-dimethylacetamide in a Hobart mixer is added 2400 g. of pyromellitic dianhydride. During the course of the reaction additional portions of solvent are added, and the temperature of the reaction mass rises from room temperature to 36° C. The solids content of the final solution is 12.8% and the inherent viscosity of the polyamide acid is 2.25.

Paraoxymethylene (6 g.) is blended into 30 g. of the above polymer solution. Then 4.07 ml. of a mixture of pyridine and acetic anhydride (3.85/6.75 by volume) is added quickly and mixed into the polymer solution. Films are made with a 40 mil doctor knife. These are dried in a forced draft air oven for 5 min. at 150° C., then at 350° C. in a muffle furnace for 2 min. The foamed polyimide products are cardboard-like in appearance, containing many very small holes.

The use of linear polyoxymethylenes as foaming agents for thermoplastic polymeric resins represents a noteworthy advance in foamed polymer technology.

Utilization of these foaming agents fulfills the need for an effective, inexpensive foaming agent which is compatible with the material to be foamed and does not cause undesirable by-products to be retained in the final product.

The process of preparing foam polymeric products employing these agents is simple, effective and readily adaptable to various types of foamable material.

The foamed products formed by this process find use in a great number of end use applications such as for replacement for lumber, insulation, sound barriers, cushioning materials, shock absorbent materials, packaging decorative materials, etc.

What is claimed is:

1. A process for preparing a foamed thermoplastic article comprising: blending a foamable thermoplastic resin selected from the group consisting of homopolymers and interpolymers of monomeric compounds of the formula

wherein $R^1$ is selected from the group consisting of hydrogen, halogen,

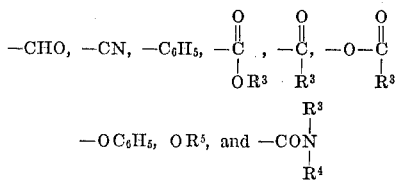

$R^3$ and $R^4$ are each selected from the group consisting of hydrogen and alkyl,
$R^5$ is alkyl and
$R^2$ is selected from the group consisting of $R^1$, hydrogen and alkyl of 1–4 carbon atoms, with 0.05 to 30% by weight of the total blend of an unstabilized linear polyoxymethylene; heating the blend to a temperature above which the unstabilized linear polyoxymethylene decomposes for a time sufficient to allow the released gaseous formaldehyde to expand the thermoplastic polymer and cooling the resultant foamed product.

2. The process of claim 1 wherein the foamable thermoplastic polymer is polyethylene.

3. The process of claim 1 wherein the foamable thermoplastic polymer is polypropylene.

4. The process of claim 1 wherein the foamable thermoplastic polymer is an ethylene-vinyl acetate copolymer.

5. The process of claim 1 wherein the foamable thermoplastic polymer is polyvinyl chloride.

6. The process of claim 1 wherein the foamable thermoplastic polymer is polyacrylonitrile.

7. A composition of matter comprising: an intimate blend of a foamable thermoplastic resin selected from the group consisting of homopolymers and interpolymers of monomeric compounds of the formula

wherein $R^1$ is selected from the group consisting of hydrogen, halogen,

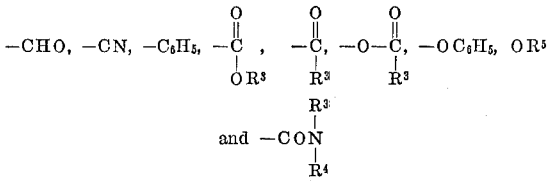

$R^3$ and $R^4$ are each selected from the group consisting of hydrogen and alkyl,
$R^5$ is alkyl and
$R^2$ is selected from the group consisting of $R^1$, hydrogen and alkyl of 1–4 carbon atoms, and 0.05 to 30% by weight, based on the total weight of the blend, of an unstabilized linear polyoxymethylene.

8. The composition of matter of claim 7 wherein the thermoplastic polymeric resin is polyethylene.

References Cited

UNITED STATES PATENTS

| | | | |
|---|---|---|---|
| 2,768,994 | 10/1956 | MacDonald | 260—67EP |
| 3,081,269 | 3/1963 | Shannon et al. | 260—2.5F |
| 3,290,261 | 12/1966 | Goldblum | 260—2.5 |

MURRAY TILLMAN, Primary Examiner

M. FOELAK, Assistant Examiner

U.S. Cl. X.R.

260—67, 874, 897, 899